(12) United States Patent
Nasir et al.

(10) Patent No.: US 10,989,219 B2
(45) Date of Patent: Apr. 27, 2021

(54) DIFFUSER ASSEMBLIES FOR COMPRESSION SYSTEMS

(71) Applicant: HONEYWELL INTERNATIONAL INC., Morris Plains, NJ (US)

(72) Inventors: Shakeel Nasir, Torrance, CA (US);
Nick Nolcheff, Chandler, AZ (US);
Cristopher Frost, Scottsdale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 128 days.

(21) Appl. No.: 16/266,484

(22) Filed: Feb. 4, 2019

(65) Prior Publication Data
US 2020/0248712 A1    Aug. 6, 2020

(51) Int. Cl.
*F04D 29/44*    (2006.01)
*F04D 29/22*    (2006.01)

(52) U.S. Cl.
CPC ......... *F04D 29/44* (2013.01); *F04D 29/2222* (2013.01)

(58) Field of Classification Search
CPC .............................. F04D 29/44; F04D 29/2222
See application file for complete search history.

(56) References Cited

U.S. PATENT DOCUMENTS

| | | | | |
|---|---|---|---|---|
| 3,442,441 | A * | 5/1969 | Wilhelm | F01D 5/142 |
| | | | | 415/193 |
| 3,861,826 | A * | 1/1975 | Dean, Jr. | F04D 29/444 |
| | | | | 415/208.4 |
| 3,873,232 | A | 3/1975 | Stein et al. | |
| 4,824,325 | A * | 4/1989 | Bandukwalla | F04D 29/444 |
| | | | | 415/208.4 |
| 4,859,145 | A * | 8/1989 | Sidransky | F04D 21/00 |
| | | | | 415/211.1 |
| 5,207,054 | A * | 5/1993 | Rodgers | F01D 9/023 |
| | | | | 60/751 |
| 5,316,441 | A * | 5/1994 | Osborne | F04D 29/444 |
| | | | | 415/208.3 |

(Continued)

FOREIGN PATENT DOCUMENTS

| | | |
|---|---|---|
| EP | 3141761 A1 | 3/2017 |
| WO | 0118404 A1 | 3/2001 |

*Primary Examiner* — Christopher Verdier
*Assistant Examiner* — Theodore C Ribadeneyra
(74) *Attorney, Agent, or Firm* — Lorenz & Kopf, LLP

(57) ABSTRACT

Circumferentially-split diffuser assemblies utilized within compression systems, such as centrifugal and mixed-flow compression systems employed within gas turbine engines, are provided. In embodiments, the diffuser assembly includes flow passages, which extend through the diffuser assembly and which include diffuser flow passage sections. Diffuser airfoils are interspersed with the diffuser flow passage sections. The diffuser airfoils include inboard and outboard airfoil segments distributed around a diffuser assembly centerline. The inboard and outboard airfoil segments are contained in and, thus, defined by inner and outer annular diffuser structures, respectively. The outer annular diffuser structure circumscribes the inner annular diffuser structure. In certain cases, the inboard airfoil segments and at least a portion of inner annular diffuser structure are composed of a first material, while the outboard airfoil segments and at least a portion of outboard annular diffuser structure are composed of a second material different than the first material.

13 Claims, 5 Drawing Sheets

(56) References Cited

U.S. PATENT DOCUMENTS

| | | | |
|---|---|---|---|
| 5,417,547 A * | 5/1995 | Harada | F04D 29/444 |
| | | | 415/208.4 |
| 5,516,263 A * | 5/1996 | Nishida | F04D 29/444 |
| | | | 415/208.2 |
| 6,280,139 B1 | 8/2001 | Romani et al. | |
| 6,506,023 B1 | 1/2003 | Chien et al. | |
| 6,540,481 B2 * | 4/2003 | Moussa | F01D 9/045 |
| | | | 415/208.2 |
| 6,607,353 B2 * | 8/2003 | Masutani | F04D 29/462 |
| | | | 415/161 |
| 6,619,923 B2 | 9/2003 | Chien | |
| 7,025,566 B2 | 4/2006 | Sasu et al. | |
| 7,097,411 B2 | 8/2006 | Smoke et al. | |
| 7,717,672 B2 | 5/2010 | Barton et al. | |
| 8,100,643 B2 * | 1/2012 | Leblanc | F04D 29/444 |
| | | | 415/208.2 |
| 9,074,483 B2 | 7/2015 | Breeze-Stringfellow et al. | |
| 9,222,485 B2 | 12/2015 | Brown et al. | |
| 9,581,170 B2 | 2/2017 | Holbrook | |
| 9,631,814 B1 | 4/2017 | Barton et al. | |
| 9,683,571 B2 | 6/2017 | Morrison et al. | |
| 9,726,032 B2 | 8/2017 | Ress, Jr. et al. | |
| 9,890,792 B2 | 2/2018 | Tarnowski et al. | |
| 10,544,693 B2 * | 1/2020 | Nasir | F04D 17/025 |
| 2005/0232762 A1 * | 10/2005 | Smoke | F04D 29/624 |
| | | | 415/206 |
| 2008/0056892 A1 * | 3/2008 | Barton | F04D 29/644 |
| | | | 415/191 |
| 2009/0304502 A1 * | 12/2009 | Nolcheff | F01D 9/041 |
| | | | 415/208.2 |
| 2013/0034425 A1 | 2/2013 | Biscay et al. | |
| 2013/0280060 A1 | 10/2013 | Nasir | |
| 2017/0342847 A1 | 11/2017 | Mazur et al. | |
| 2017/0362947 A1 | 12/2017 | Nasir et al. | |

\* cited by examiner

DIFFUSER ASSEMBLIES FOR COMPRESSION SYSTEMS

TECHNICAL FIELD

The present invention relates generally to diffuser assemblies and, more particularly, to diffuser assemblies having circumferentially-split constructions, embodiments of which provide extended service life, weight savings, and other benefits over conventional diffuser assemblies.

BACKGROUND

Diffuser assemblies are employed in compression systems to reduce the velocity of compressed airflow, while increasing static pressure prior to delivery of the airflow into, for example, a combustion section of a Gas Turbine Engine (GTE). When containing wedge-shaped vanes or airfoils located between opposing endwalls, a diffuser assembly may be more specifically referred to as a "wedge diffuser assembly." Wedge diffuser assemblies are utilized within GTEs and other turbomachines containing compressor rotors, such as impellers, which discharge compressed airflow in purely radial directions or in radial and axial directions. When installed within a GTE, a given wedge diffuser assembly may be positioned around an impeller (or other rotor) to receive the compressed airflow discharged therefrom. The airflow decelerates and static pressure increases as the airflow passes through the diffuser assembly. The airflow may further be conditioned by a deswirl flow passage section, which may be included in or located downstream of the diffuser assembly. The airflow is then delivered into the combustion section of the GTE, injected with a fuel mist, and ignited to generate combustive gasses, which then flow through one or more turbines to produce the power output of the GTE.

Certain GTE platforms require the transmission of structural loads, such as bearing loads, across the main body of a wedge diffuser assembly. Rapid material fatigue can result within the diffuser assembly, particularly at the vane-endwall junctures, if such structural loads are transmitted directly through the diffuser airfoils. The service lifespan of the diffuser assembly may be reduced as a result. While it may be possible to enlarge the dimensions of the airfoils generally to reduce material fatigue in such instances, such a solution is sub-optimal and typically reduces aerodynamic performance. For this reason, wedge diffuser assemblies are now commonly produced to include so-called "through-bolt architectures." Such through-bolt architectures enable the transmission of structural loads across the body of the diffuser through load-bearing mounting bolts, which span the diffuser endwalls and bypass the diffuser airfoils. This, in turn, reduces material fatigue to prolong the service life of the diffuser assembly.

While providing the above-noted advantages, diffuser assemblies having through-bolt constructions are associated with various limitations. As an inherent byproduct of the through-bolt design, certain structural accommodations may be required to enable the passage of the through-bolts across the diffuser body, with such accommodations protecting adding weight and manufacturing cost, while detracting from the aerodynamic performance of the diffuser assembly. Through-bolt constructions also typically place undesired restrictions on the bolt count and distribution pattern, which again results in sub-optimal structural designs. As a still further drawback, through-bolt diffuser assemblies do little to address other limitations associated with conventional wedge diffuser designs, such as issues related to rapid erosion of the leading airfoil edges and titanium fire susceptibility. An ongoing demand thus persists in the aerospace industry and other technology sectors for a load-bearing diffuser assembly, such as a load-bearing wedge diffuser assembly, capable of overcoming many, if not all of the aforementioned limitations. Embodiments of such load-bearing diffuser assemblies are provided herein.

BRIEF SUMMARY

Circumferentially-split diffuser assemblies utilized within compression systems, such as centrifugal and mixed-flow compression systems employed within gas turbine engines, are provided. In various embodiments, the circumferentially-split diffuser assembly contains flow passages, which extend through the diffuser assembly and which include diffuser flow passage sections. Diffuser airfoils are interspersed with and partition the diffuser flow passage sections. The diffuser airfoils include inboard and outboard airfoil segments, which are distributed around a centerline of the circumferentially-split diffuser assembly. The inboard and outboard airfoil segments are defined by (that is, formed by portions of) inner and outer annular diffuser structures, respectively. The outer annular diffuser structure is attached to and circumscribes the inner annular diffuser structure. In certain cases, the inboard airfoil segments and at least a portion of inner annular diffuser structure are composed of a first material, while the outboard airfoil segments and at least a portion of outboard annular diffuser structure are composed of a second disparate material.

In other embodiments, the circumferentially-split diffuser assembly contains flow passages extending through the diffuser assembly and including diffuser flow passage sections. Forward and aft endwalls bound the diffuser flow passage sections and are spaced along a centerline of the circumferentially-split diffuser assembly. Diffuser airfoils are angularly interspersed with the diffuser flow passage sections, as taken about the centerline. The diffuser airfoils include inboard airfoil segments distributed around the centerline and composed of a first material. The diffuser airfoils also include outboard airfoil segments, which are distributed around the centerline at locations adjacent the inboard airfoil segments and which are composed of a second material different than the first material. In certain implementations, an inner annular portion of the aft endwall is fabricated from the first material, while an outer annular portion of the aft endwall is fabricated from the second material. The first material is usefully selected to possess a lower titanium content (perhaps, an essentially 0% titanium content by weight) and a higher abrasion resistance than does the second material. The inboard and outboard airfoil segments may also each include at least one non-linear sidewall region in embodiments.

Various additional examples, aspects, and other useful features of embodiments of the present disclosure will also become apparent to one of ordinary skill in the relevant industry given the additional description provided below.

BRIEF DESCRIPTION OF THE DRAWINGS

At least one example of the present invention will hereinafter be described in conjunction with the following figures, wherein like numerals denote like elements, and.

Figure 1:
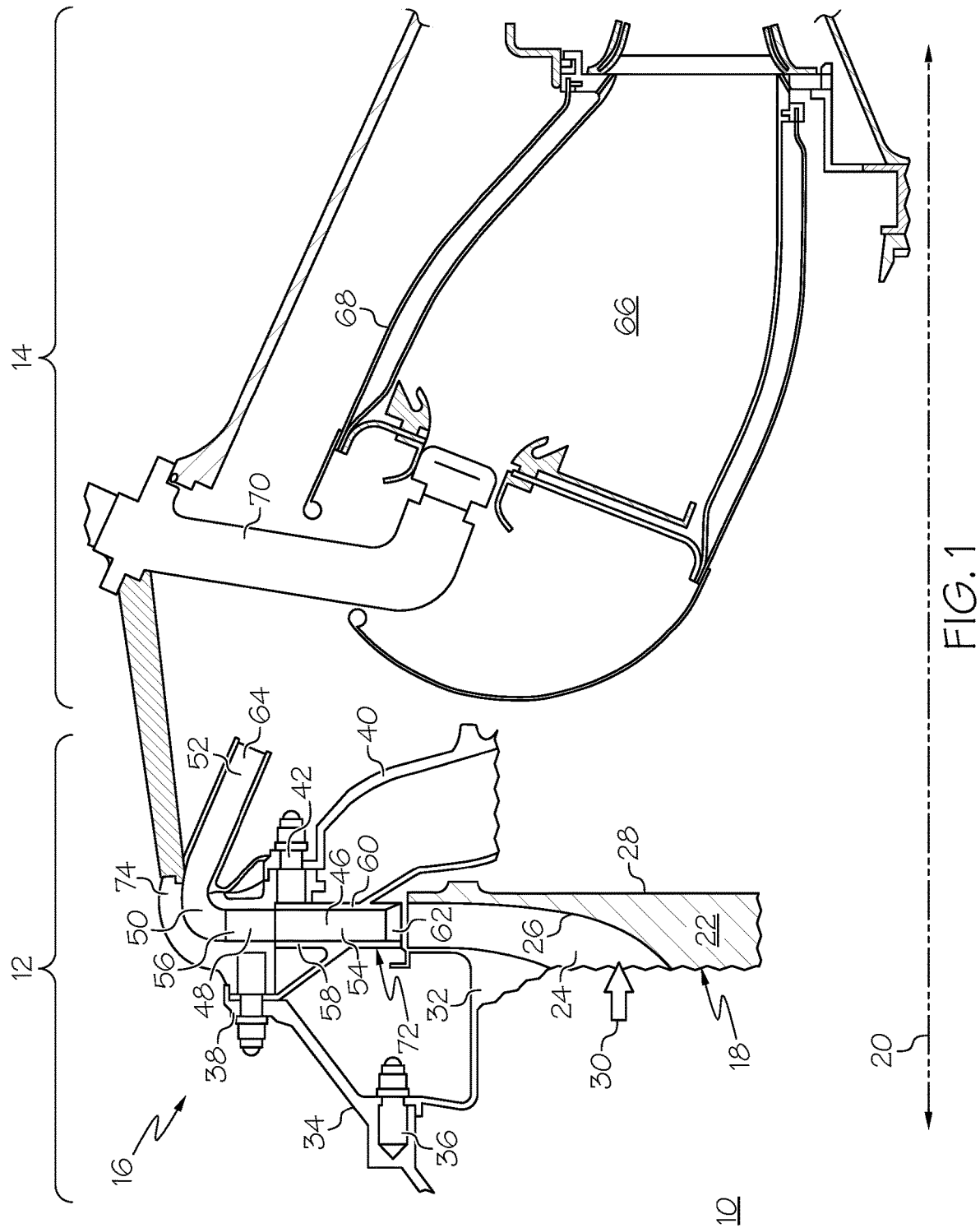
FIG. 1 is a cross-sectional schematic of a GTE combustor section and compressor section (both partially shown)
Figure 2:
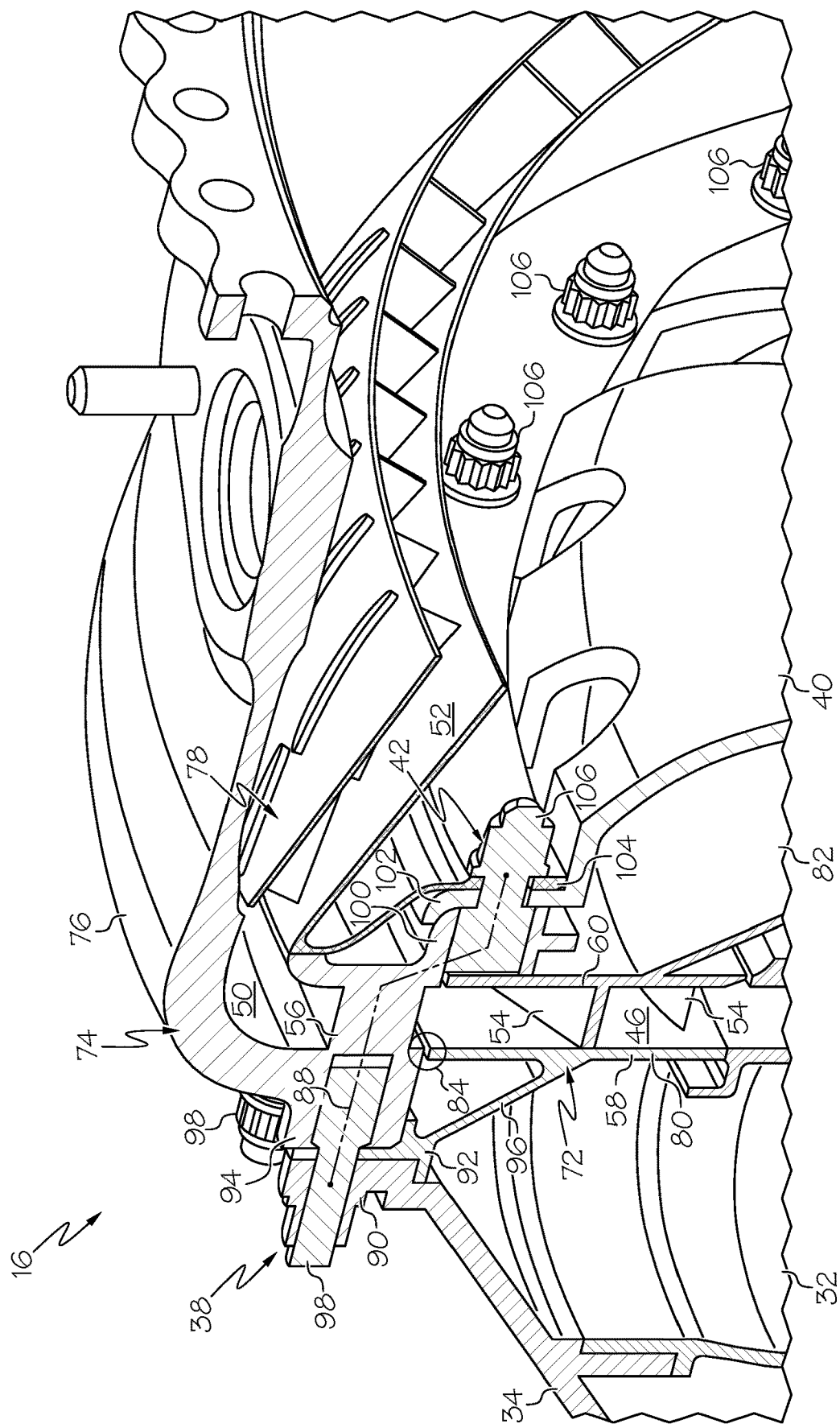
Figure 3:
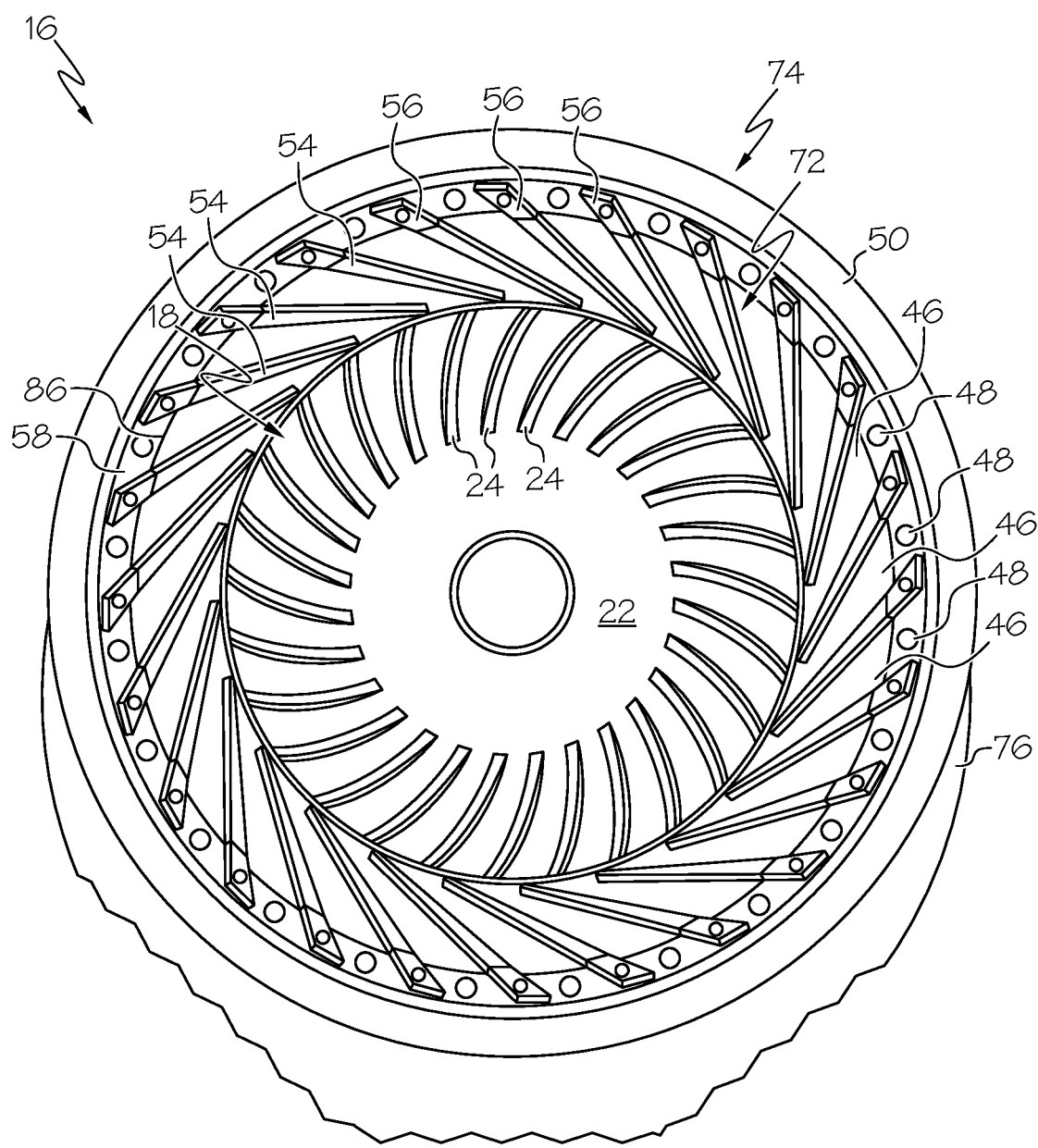
Figure 4:
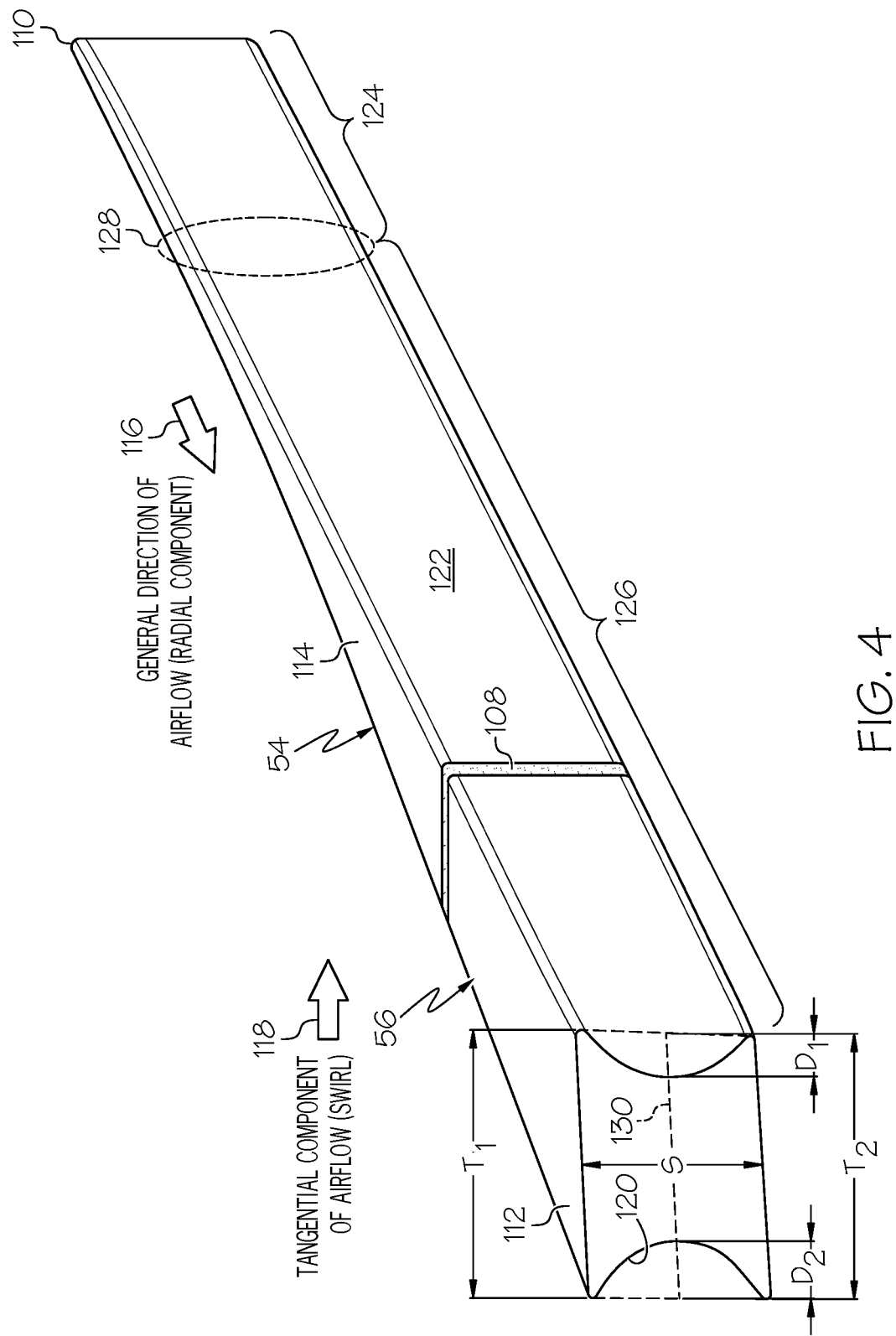
Figure 5:
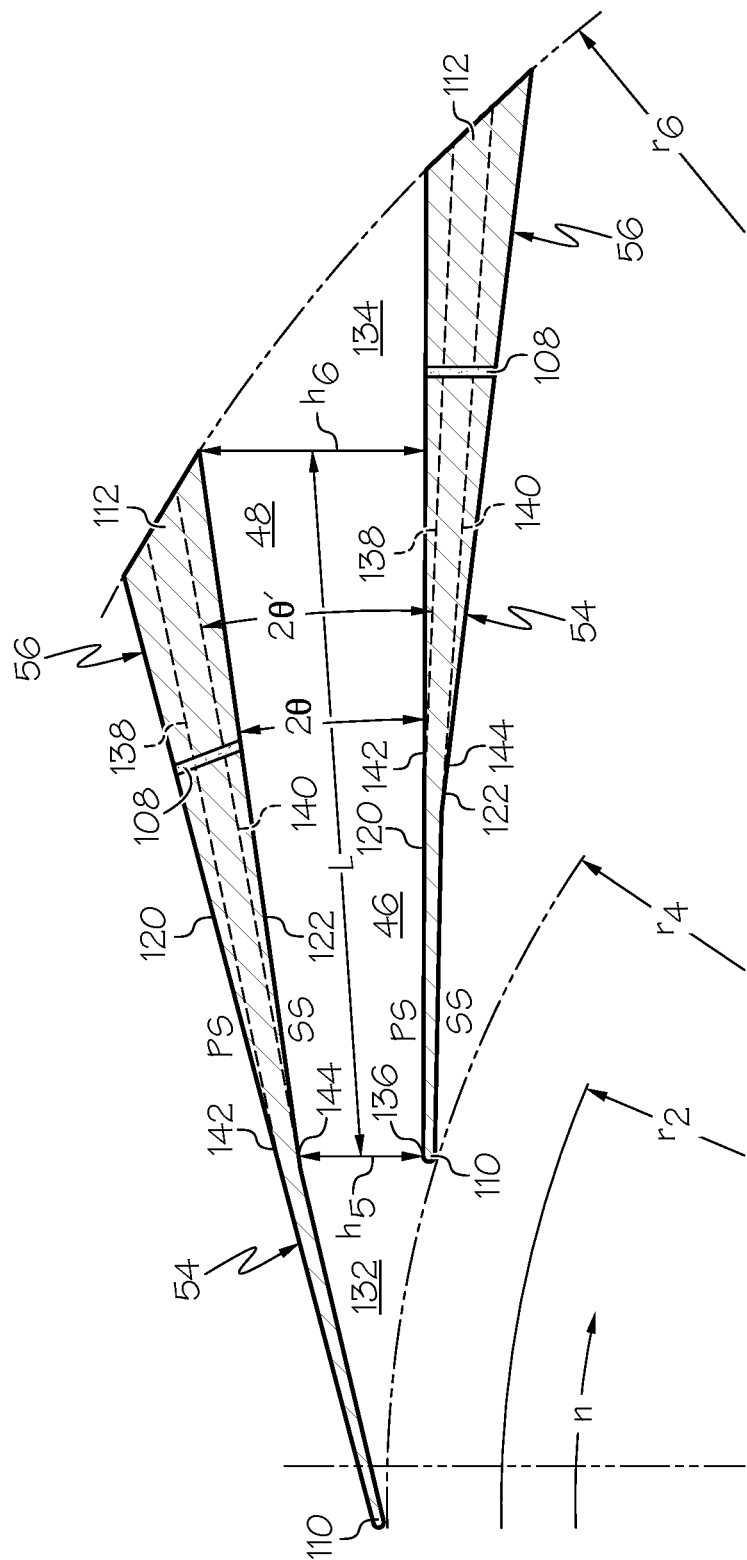

including a circumferentially-split diffuser assembly, as illustrated in accordance with an exemplary embodiment of the present disclosure;

FIG. 2 is a cross-sectional isometric view of the GTE compressor section shown in FIG. 1 illustrating the exemplary circumferentially-split diffuser assembly in greater detail and further demarcating a primary load path through the diffuser assembly;

FIG. 3 is an isometric cutaway view of the GTE compressor section shown in FIG. 1 further illustrating the exemplary circumferentially-split diffuser assembly;

FIG. 4 is an isometric view of a split diffuser airfoil suitably contained in the circumferentially-split diffuser assembly and having a non-linear or "two-theta (2θ)" sidewall geometry, which can improve certain performance aspects of the diffuser assembly; and FIG. 5 is an axial view (that is, a view taken an axis parallel to the centerline of the diffuser assembly) of two adjacent airfoils suitably included in the exemplary diffuser assembly of FIGS. 1-3 identifying the flow passage divergence angles and other dimensional parameters of the diffuser assembly in embodiments.

For simplicity and clarity of illustration, the drawing figures illustrate the general manner of construction, and descriptions and details of well-known features and techniques may be omitted to avoid unnecessarily obscuring the exemplary and non-limiting embodiments described in the subsequent Detailed Description. It should further be understood that features or elements appearing in the accompanying figures are not necessarily drawn to scale unless otherwise stated.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description. The term "exemplary," as appearing throughout this document, is synonymous with the term "example" and is utilized repeatedly below to emphasize that the following description provides only multiple non-limiting examples of the invention and should not be construed to restrict the scope of the invention, as set-out in the Claims, in any respect.

Definitions

Diffuser Assembly—A device assembled from at least two separately-fabricated components or structures and containing at least diffuser flow passage section, which promotes diffusion of high pressure airflow conducted therethrough.

Inboard—a relative term indicating that a named structure or item is located closer to the centerline of a Gas Turbine Engine (GTE) or GTE component (e.g., a diffuser assembly) than an "outboard" structure or item, as defined below.

Outboard—a relative term indicating that a named structure or item is located further from the centerline of a GTE or GTE component (e.g., a diffuser assembly) than an "inboard" structure or item, as defined above.

Wedge Diffuser Assembly—A diffuser assembly (defined above) containing a plurality of airfoils having airfoil thicknesses at or adjacent the downstream (e.g., outboard) ends of the airfoils exceeding, and generally tapering downward to, the airfoil thicknesses at or adjacent the upstream (e.g., inboard) ends of the airfoils.

Overview

The following describes circumferentially-split diffuser assemblies suitable for usage within compression systems, such as centrifugal and mixed-flow compression systems employed within GTEs and other turbomachines. As indicated by the term "circumferentially-split," embodiments of the diffuser assembly contain at least two primary components or bodies: an inner annular diffuser structure and an outer annular diffuser structure, which circumscribes or extends around the inner annular diffuser structure. When the circumferentially-split diffuser assembly is fully assembled, the inner and outer annular diffuser structures combine to define the main diffuser body of the diffuser assembly; that is, the portion of the diffuser assembly containing diffuser flow passage sections interspersed with (e.g., wedge-shaped) diffuser vanes in an annular array. The inner and outer annular diffuser structure are separately fabricated as discrete (non-integral) structures or components. The inner and outer annular diffuser structures can each be composed of a single piece or, instead, can each be constructed from multiple pieces. Regardless of its particular construction, the inner annular diffuser structure defines (that is, contains structural features serving as) inboard portions of the diffuser airfoils; while the outer annular diffuser structure defines (that is, contains structural features serving as) outboard portions of the diffuser airfoils.

The circumferentially-split diffuser assembly may usefully include a unique mounting architecture, which enables the transmission of structural loads across the outer annular diffuser structure, while largely or wholly bypassing the inner annular diffuser structure. In various embodiments, such structural (e.g., GTE bearing) loads may be transmitted from a first (forward) attachment interface, through an outer annular portion of the forward endwall, across the outboard airfoil portions, through an outer annular portion of the aft endwall, and to a second (aft) attachment interface. In this manner, structural loads are transferred axially across the diffuser body through the relatively thick outboard airfoil portions and without reliance on independent load-bearing members, such as through-bolts. The inner annular diffuser structure and, more specifically, the inboard diffuser airfoil portions may thus be largely, if not wholly isolated from such structural loads. Multiple benefits may be realized as a result. For example, in embodiments, the inboard diffuser airfoil portions (and other structural features of the inner annular diffuser structure) can be imparted with relatively thin-walled geometries to enhance aerodynamic performance (in the case of the airfoils), to reduce weight, and to provide other benefits. Concurrently, material fatigue may be reduced at the junctures between the inboard airfoil portions and the endwalls, which are exposed to thermal extremes and other harsh operating conditions, to prolong the service life of the diffuser assembly.

The circumferentially-split construction of the diffuser assembly further enables fabrication of the inboard airfoil portions (and, perhaps, the entirety of the inner annular diffuser structure) and the outboard airfoil portions (and, perhaps, the entirety of the outer annular diffuser structure) from disparate materials tailored to unique local environments and operating demands. For example, in the case of the inner annular diffuser structure, this structure may be partially or wholly fabricated from an erosion-resistant material to decrease erosion at the leading airfoil edges and neighboring structural regions exposed to thermal extremes and high Mach airflow discharged from the compressor rotor.

Concurrently, the inboard annular diffuser structure may be composed of a material having a relatively low titanium (Ti) content or lacking Ti to reduce or eliminate Ti-fire concerns. Comparatively, the outer annular diffuser structure may be partially or wholly composed of a material, such as Ti-based alloy, having a higher Ti content. Additionally or alternatively, the outer annular diffuser structure may be composed of a material having a lower density for weight savings.

Various additional benefits may be realized by embodiments of the circumferentially-split diffuser assembly including, for example, facilitating compressor section installation of the diffuser assembly and/or enabling an optimized fastener count (via the elimination of a conventional through-bolt architecture). Such benefits are further discussed below in connection with the exemplary embodiment of the circumferentially-split diffuser assembly shown in FIGS. 2-4. First, however, an overarching description of GTE compressor section containing a circumferentially-split diffuser assembly is provided in connection with FIG. 1 to help establish an exemplary, albeit non-limiting context in which embodiments of the present disclosure may be better understood.

Non-Limiting Example of a Gas Turbine Engine Containing the Diffuser Assembly

FIG. 1 is a simplified cross-sectional view of a GTE 10 including a compressor section 12 and a combustion section 14, both of which are partially shown. Compressor section 12 (also referred to herein as "centrifugal compression system 12") contains a circumferentially-split diffuser assembly 16, which is fabricated in accordance with an exemplary embodiment of the present disclosure and which is discussed more fully below. While diffuser assembly 16 is discussed below principally in the context of centrifugal compression system 12, circumferentially-split diffuser assembly 16 can be utilized within various other types of compression systems, regardless of whether such systems are contained in a GTE (propulsive or other), a different turbomachine (e.g., a turbocharger), or another device or system. Further, diffuser assembly 16 is not limited to usage within centrifugal compression systems, but rather can be utilized within various other types of compression systems including mixed-flow compression systems. The term "mixed-flow compression system," as appearing herein, refers to a compression system in which compressed airflow is discharged from a compressor rotor with an axial component and a radial component of comparable magnitudes. When employed within such a mixed-flow compression system, the main body of diffuser assembly 16 have a leaned or conical construction to better align the diffuser flow channels with the direction of airflow discharged from the compressor rotor. Accordingly, and as previously indicated, the following description of GTE 10 should be understood as merely establishing an exemplary, albeit non-limiting context in which embodiments of circumferentially-split diffuser assembly 16 may be better understood.

The illustrated portion of centrifugal compression system 12 includes a centrifugal compressor or impeller 18, only the trailing portion of which is shown in FIG. 1. During GTE operation, impeller 18 spins rapidly about its centerline or rotational axis, which is represented by dashed line 20. Dashed line 20 is also representative of the centerline of diffuser assembly 16 and GTE 10 generally and is consequently referred to hereafter as "centerline 20." Impeller 18 and diffuser assembly 16 will typically be generally axisymmetric about centerline 20, as will many of the components contained within GTE 10. Thus, when viewed in three dimensions, impeller 18 may possess a generally conical shape, while diffuser assembly 16 may have a substantially annular or ring-like geometry. Discussing impeller 18 in greater detail, impeller 18 includes a central body 22 from which a number of impeller airfoils or blades 24 project (only one of which is shown in FIG. 1). Impeller blades 24 wrap or twist about centerline 20 in, for example, the direction of rotation of impeller 18. The outer conical surface or "hub" of impeller 18 is identified in FIG. 1 by reference numeral 26, while the backside or "disk" surface of impeller 18 is identified by reference numeral 28. As further indicated by arrow 30, a number of hub flow paths extend over hub 26 and are separated by impeller blades 24.

Impeller 18 and, more specifically, hub flow paths 30 are further enclosed by a shroud 32, which is partially shown in FIG. 1 as positioned around an outer periphery of impeller 18. Shroud 32 is affixed to a first primary infrastructure member of GTE 10, here a compressor case or frame 34 (partially shown), at an attachment interface 36. Similarly, circumferentially-split diffuser assembly 16 is mounted to compressor frame 34 at a forward attachment interface 38. Diffuser assembly 16 is further affixed or mounted to a second primary infrastructure member of GTE 10, here a sump housing or bearing support structure 40 (again, partially shown), at an aft attachment interface 42. As an example, attachment interfaces 38, 42 may be realized as clamp-like mechanisms including bolts or fasteners, which join multiple structures together to provide a robust mechanical connection or joinder interface. Attachment interfaces 38, 42 may have substantially annular or ring-like geometries when viewed in three dimensions and are substantially coaxial with centerline 20. The fasteners contained in attachment interfaces 38, 42 may have a non-penetrating design; that is, may terminate prior to breaching the main diffuser body of diffuser assembly 16 defined by the diffuser endwalls and airfoils. Such non-penetrating attachment architecture should be contrasted against the above-described through-bolt architectures and provides a number of benefits as further discussed below in connection with FIGS. 2-4.

A number of flow passages 46, 48, 50, 52 extend through circumferentially-split diffuser assembly 16. Flow passages 46, 48, 50, 52 each include: (i) a diffuser flow passage section 46, 48; (ii) a flow passage bend 50; and (iii) a deswirl flow passage section 52. Flow passages 46, 48, 50, 52 include diffuser assembly inlets 62, which are distributed (e.g., angularly spaced at regular intervals) about an inner periphery of diffuser assembly 16 and positioned to receive airflow discharged from impeller 18. Flow passages 46, 48, 50, 52 further terminate in flow passage outlet 64, which discharge compressed airflow into combustion section 14 of GTE 10. In further embodiments, flow passages 46, 48, 50, 52 may have a different geometry potentially omitting either or both of flow passage bend 50 and deswirl flow passage section 52. Diffuser flow passage sections 46, 48 are interspersed with and partitioned by a plurality of diffuser vanes or airfoils 54, 56 (only one of which can be seen in FIG. 1). Diffuser airfoils 54, 56 are arranged in an annular array or circumferentially-spaced grouping, which is disposed between two annular plate-like bodies or endwalls 58, 60. Endwall 58 is referred to herein as the "shroud-side" or "forward" endwall 58 in view of its forward position relative to endwall 60, as taken along centerline 20. Conversely, endwall 60 is referred to as the "disk-side" or "aft" endwall 60 in view of its positioning relative to endwall 58 along centerline 20. Endwalls 58, 60 are spaced along centerline 20 by a predetermined distance, with the axial spacing between endwalls 58, 60 equivalent to the span of diffuser airfoils 54, 56.

During operation of GTE 10, centrifugal impeller 18 discharges compressed airflow in radially-outward directions (away from centerline 20) and into inlets 62 of diffuser assembly 16. After flowing through diffuser flow passage sections 46, 48, the pressurized airflow passes through flow passage bend 50, which turns the airflow back toward centerline 20 of GTE 10. The newly-compressed airflow then further passes through deswirl flow passage section 52, which contains airfoils, baffles, or the like, to reduce any tangential component of the airflow remaining from the action of impeller 18. Afterwards, the pressurized airflow is discharged from circumferentially-split diffuser assembly 16 through flow passage outlets 64. Entering combustion section 14, the pressurized airflow is received within combustion chamber 66 of combustor 68. A fuel spray is injected into combustion chamber 66 via fuel injector 70, and the fuel-air mixture is ignited within combustor 68. The resulting combustive gasses are discharged from combustor 68 and directed into a non-illustrated turbine section of GTE 10 to generate the desired power output, whether mechanical, electrical, pneumatic, or hydraulic in nature, or a combination thereof. When assuming the form of a propulsive engine, such as a propulsive engine carried by an aircraft, GTE 10 may also discharge the combustive gases through a non-illustrated exhaust section to generate thrust. In other embodiments, GTE 10 may assume the form of a non-propulsive engine, such as an Auxiliary Power Unit (APU) deployed onboard an aircraft, or an industrial power generator. With the operation of GTE 10 now described, additional discussion of circumferentially-split diffuser assembly 16 is set-forth with reference to FIGS. 2-4.

Example of the Circumferentially-Split Diffuser Assembly Discussed in Greater Detail Referring now to FIGS. 2 and 3 in conjunction with FIG. 1, circumferentially-split diffuser assembly 16 is assembled from at least two primary components or structures: an inner annular diffuser structure 72 and an outer annular diffuser structure 74. Outer annular diffuser structure 74 is attached to and extends around or circumscribes inner annular diffuser structure 72. Diffuser structures 72, 74 are independently fabricated as separate and distinct components, but cooperate or combine when matingly assembled to define diffuser airfoils 54, 56 and diffuser flow passage sections 46, 48. Specifically, outer annular diffuser structure 74 defines radially outer (downstream) segments of airfoils 54, 56, hereafter referred to as "outboard airfoil segments 56." Accordingly, at least in the depicted embodiment, outboard airfoil segments 56 are formed as an integral part of outer annular diffuser structure 74. It will be appreciated, however, in other embodiments the airfoils could be machined into one wall with the other wall brazed thereon. Conversely, inner annular diffuser structure 72 defines radially-inner (upstream) portions of airfoils 54, 56. Accordingly, inboard airfoil segments 54 are formed as an integral part of inner annular diffuser structure 72 and are located closer to centerline 20 than are outboard airfoil segments 56.

In addition to inboard airfoil segments 54, inner annular diffuser structure 72 further defines an inboard or upstream portion 46 of diffuser flow passage sections 46, 48; an inner annular band or section of forward endwall 58; and an inner annular band or section of aft endwall 60. Comparatively, outer annular diffuser structure 74 defines an outboard or downstream portion 48 of diffuser flow passage sections 46, 48; an outer annular band or section of forward endwall 58; and an outer annular band or section of aft endwall 60. In the illustrated example, outer annular diffuser structure 74 is produced as a relatively complex component, which further defines flow passage bend 50 and outer diffuser case or wall 76. In alternative implementations, flow passage bend 50 and outer diffuser case wall 76 may be defined by other structural components or parts contained in circumferentially-split diffuser assembly 16. Finally, deswirl flow passage section 52 is defined by a separately-fabricated deswirl member 78 further included in diffuser assembly 16. In other instances, deswirl member 78 may be integrally formed with outer annular diffuser structure 74 or, perhaps, omitted from diffuser assembly 16.

Inner and outer annular diffuser structure 72, 74 may each be fabricated as a single, monolithic piece; or, instead, assembled from any number of discretely-fabricated parts or components. In the embodiment shown in FIGS. 1-3, outer annular diffuser structure 74 is fabricated as a single piece utilizing, for example, a casting or additive manufacturing process. In contrast, inner annular diffuser structure 72 is assembled from a forward inner diffuser piece 80 and an aft inner diffuser piece 82. Diffuser airfoils 54, 56 may be integrally formed with either, both, or neither of diffuser pieces 80, 82, depending upon the particular manufacturing approach employed to produce diffuser assembly 16. In one approach, forward inner diffuser piece 80 (including an inner portion of forward endwall 58) and diffuser airfoils 54, 56 are produced as a single or monolithic piece by, for example, casting or utilizing removing material from a blank utilizing appropriate machining techniques. In such an implementation, aft inner diffuser piece 82 (including an inner portion of aft endwall 60) may be separately fabricated in this case, and then brazed or otherwise bonded to forward inner diffuser piece 80. This construction can also be inverted such that diffuser airfoils 54, 56 are integrally formed with aft inner diffuser piece 82. In still other instances, forward and aft inner diffuser pieces 80, 82 may be replaced by a single or monolithic structure produced utilizing, for example, a casting or additive manufacturing process. Various other constructions are also possible and within the scope of the present disclosure.

As indicated in FIG. 2 in dashed circle 84, an inner circumferential edge of outer annular diffuser structure 74 may be placed in proximity of an outer circumferential edge of inner annular diffuser structure 72. These edges may be placed in intimate contact in embodiments, but are usefully separated by an annular spacing or circumferential gap 86 (identified in FIG. 3). Annular gap 86 may be filled by a non-illustrated sealing material or a sealing member, such as an annular V- or W-seal, in embodiments. When present, annular gap 86 may helpful reduce vibration transmission from outer annular diffuser structure 74 to inner annular diffuser structure 72. Generally, the provision of annular gap 86 is advantageous in that outer annular diffuser structure 74 may be implemented as a load-bearing structure, which carries structural loads across the main body of diffuser assembly 16; while inner annular diffuser structure 72 may be largely or wholly shielded from such structural loads. This may, in turn, enable greater flexibility in selecting the dimensions and material composition of diffuser structure 72. The primary load transmission path for transmitting vibratory and other structural loads across the body of diffuser assembly 16, and specifically across outer annular diffuser structure 74, while bypassing inner annular diffuser structure 72, is represented in FIG. 2 by dashed line 88 and discussed in greater detail below. Annular gap 86 may also help accommodate thermal growth of inner annular diffuser structure 72, which may be exposed to thermal extremes due to the compressed airflow discharged from impeller 18 (FIG. 1).

Circumferentially-split diffuser assembly 16 further includes forward and aft attachment interfaces 38, 42. Addressing first forward attachment interface 38, this interface joins compressor frame 34, inner annular diffuser structure 72, and outer annular diffuser structure 74 in a fixed relationship. As shown most clearly in FIG. 2, the aft end of compressor frame 34 may terminate in an outer flange 90, which is placed in abutment with mating flanges 92, 94 contained in diffuser structures 72, 74, respectively. With respect to inner annular diffuser structure 72, specifically, flange 92 may be included in forward inner diffuser piece 80 and joined to the body of piece 80 via a conical arm 96. Stated differently, conical arm 96 may extend from the body of forward inner diffuser piece 80 (defining an inboard portion of forward endwall 58) in forward and outboard directions to outer circumferential flange 92, which may be matingly positioned between flanges 90, 94 in an axially-stacked relationship. Bolts or other fasteners 98 are further utilized to maintain a clamping force across flange stack 90, 92, 94, with fasteners 98 distributed around centerline 20 (FIG. 1) in an annular array. Notably, fasteners 98 do not penetrate endwall 58 and instead terminate in blind bores provided in outer annular diffuser structure 74 prior to breaching forward endwall 58. Fasteners 98 thus do not extend across diffuser flow passage section 46, 48, but rather terminate adjacent flow passage section 46, 48 and outboard airfoil segments 56.

With continued reference to FIG. 2, aft attachment interface 42 joins outer annular diffuser structure 74, bearing support structure 40, and deswirl member 78. To help form this attachment interface, outer annular diffuser structure 74 is further imparted with an inner circumferential flange 100, which is positioned adjacent the backside surface of inner annular diffuser structure 72 and, perhaps, may abut the backside surface of aft inner diffuser piece 82 as taken along centerline 20 (FIG. 1). Opposite inner annular diffuser structure 72, inner circumferential flange 100 abuts an outer circumferential flange 102 contained in bearing support structure 40. Outer circumferential flange 102, in turn, abuts an inner circumferential flange 104 contained in deswirl member 78. As was the case with forward attachment interface 38, flanges 100, 102, 104 are clamped in a stacked relationship utilizing fasteners 106, such as bolts, which may be distributed about centerline 20 (FIG. 1) in an annular array or grouping. In a manner similar to fasteners 98 contained in forward attachment interface 38, fasteners 106 do not penetrate aft end wall 60 or extend across diffuser flow passage sections 46, 48, but rather terminate adjacent aft end wall 60. In this regard, the inner terminal ends of fasteners 106 extend into bores or fastener openings provide in inner circumferential flange 100 of outer annular diffuser structure 74, while maintaining an axial separation from the backside of aft inner diffuser piece 80 and, more generally, from the backside of inner annular diffuser structure 72.

By virtue of forward and aft attachment interfaces 38, 42, a structurally-robust, non-penetrating attachment architecture is provided for securing diffuser assembly 16 within compressor section 12 (FIG. 1) without reliance on a through-bolt architecture. This removes constraints regarding fastener count and distribution pattern. An optimal fastener count may thus be chosen, with the fasteners distributed independently of the positioning of airfoils 46, 48, for improved weight savings, cost savings, and improved aerodynamic performance of diffuser assembly 16. Concurrently, the construction of circumferentially-split diffuser assembly 16 helps facilitate compressor section installation of diffuser assembly 16 within compressor section 12 of GTE 10. In other embodiments, a different attachment architecture can be employed to secure diffuser assembly 16 within compressor section 12.

The above-described diffuser assembly construction further enables structural load transmission across outer annular diffuser structure 74, while largely or wholly bypassing the inner annular diffuser structure 72. Such structural loads can be, for example, bearing loads transmitted from bearing support structure 40, across diffuser assembly 16, and to compressor frame 34. Dashed line 88 in FIG. 2 is representative of a primary load transfer path across diffuser assembly 16. As indicated by dashed line 88, structural (e.g., GTE bearing) loads may be transmitted from aft attachment interface 42, across outboard airfoil portions 56 contained in outer annular diffuser structure 74, and to forward attachment interface 38. Such structural loads are thus transferred the main diffuser body of diffuser assembly 16 (that is, the portion of diffuser assembly 16 formed by forward endwall 58, airfoils 54, 56, and aft endwall 60) through relatively thick outboard airfoil portions 56, while the inner annular diffuser structure and thinner inboard airfoil portions 54 are isolated from such structural loads. Inboard diffuser airfoil portions 54 can consequently be imparted with relatively thin-walled geometries to enhance the aerodynamic performance of diffuser assembly 16. So too may the inboard portions of forward endwall 58 and aft endwall 60 defined by inner annular diffuser structure be imparted with relatively thin-walled geometries (taken axially along centerline 20) to provide weight reductions or other benefits. Concurrently, the rate of material fatigue is reduced within inner annular diffuser structure 72, particularly at the junctures between inboard airfoil portions 54 and endwalls 58, 60. This, in turn, prolongs the service life of circumferentially-split diffuser assembly 16, which is a highly desirable benefit.

As a further benefit, the circumferentially-split construction of diffuser assembly 16 facilitates fabrication of inner annular diffuser structure 72 and outer annular diffuser structure 74 from different materials tailored to best suit local operating environments and physical demands. To this end, the regions of inner annular diffuser structure 72 defining inboard airfoil portions 54 may be composed of an erosion-resistant material to decrease erosion at the leading or innermost edges of airfoil portions 54 and other inboard regions of inner annular diffuser structure 72, which are typically subject to thermal extremes and high Mach airflow discharged from impeller 18 (FIG. 1). The material from which inner annular diffuser structure 72 is composed may also be selected to be essentially free of Ti (that is, contains less than 1%, Ti by weight) and/or to have a lesser Ti content as compared to outer annular diffuser structure 74 to reduce Ti fire susceptibility. Constraints placed on the material utilized for fabrication inner annular diffuser structure 72 are also be eased as diffuser structure 72 is required to carry little, if any structural loads. A non-exhaustive list of candidate materials for usage in fabricating inner annular diffuser structure 72 includes steels and nickel-based alloys; that is, an alloy containing nickel as its primary constituent, by weight. Forward inner diffuser piece 80 and aft inner diffuser piece 82 may be fabricated from the same or different materials.

Comparatively, outer annular diffuser structure 74 is usefully composed of a material well-suited for tolerating structural loads transmitted across diffuser structure 72 and, specifically, outboard airfoil portions 56. Further, if desired, outer annular diffuser structure 74 may be fabricated from a material having a greater Ti content as compared to the material or materials from which diffuser structure 72 is composed. In one embodiment, outer annular diffuser structure 74 is composed of a Ti-based alloy (that is, an alloy containing Ti as its primary constituent, by weight); or, at least, an alloy containing a greater weight percentage of Ti than does an alloy (or other material) from which inner annular diffuser structure 72 is at least partially composed. In view of its load bearing nature, outer annular diffuser structure 74 may be produced to an average wall thickness and volume greater than that of inner annular diffuser structure 72. Consequently, additional weight savings may also be realized by fabricating outer annular diffuser structure 74 from a material having a lower density than does the material or materials utilized to produce inner annular diffuser structure 72. The material from which outer annular diffuser structure 74 is composed may also have lower temperature tolerances relative to the material or materials composing inner annular diffuser structure 72. In embodiments, outer annular diffuser structure 74 may thus be fabricated as a single piece composed essentially of a material having any or all of the aforementioned characteristics.

Thus, in keeping with the foregoing description, aft inner diffuser piece 82 may be fabricated from a first material, while outer annular diffuser structure 74 is fabricated from a second material different than the first material. Consequently, in such embodiments, inboard airfoil segments 54 and an inner annular portion or band of aft endwall 60 may be composed of the first material; while outboard airfoil segments 56, an outer annular portion or band of aft endwall 60, and an outer annular portion or band of forward endwall 58 may be composed of the second material. Further, forward inner diffuser piece 80 may be fabricated from the first material or a still further (third) material type. Accordingly, in embodiments in which forward diffuser piece 80 (and thus inner annular diffuser structure 72) is further composed of the first material type, it may also be stated that an inner annular portion or band of forward endwall 58 is likewise composed of the first material.

In further embodiments of circumferentially-split diffuser assembly 16, various other metallic or non-metallic materials can be utilized for production of inner annular diffuser structure 72 and outer annular diffuser structure 74, noting that diffuser structures 72, 74 can be wholly or at least partially composed of the same material or similar materials in alternative implementations. This notwithstanding, production of inner annular diffuser structure 72 (including inboard airfoil portions 54) and outer annular diffuser structure 74 (including outboard airfoil portions 56) from strategically-selected, disparate materials can improve the service lifespan of diffuser assembly 16 (through reductions in erosion, material fatigue, and the like), while concurrently reducing diffuser assembly weight. This is highly desirable in the context of GTEs utilized in flight applications, such as propulsive GTEs and APUs deployed onboard aircraft.

Possible Inclusion of Non-Linear Sidewall Regions for the Airfoils of the Diffuser Assembly As a point of emphasis, airfoils 54, 56 contained in circumferentially-split diffuser assembly 16 can be imparted with any suitable geometry and dimensions, noting that the particular geometry and dimensions may be held consistent or may instead vary from airfoil to airfoil. In many, but not necessarily all instances, airfoils 54, 56 will have a wedge-shaped geometry when viewed along centerline 20. Further, the sidewalls or faces of airfoils 54, 56 may be imparted with a linear geometry, non-linear geometry, or any combination thereof. Certain performance, however, can be realized by imparting the sidewalls of airfoils 54, 56 with non-linear sidewall regions; that is, sidewall regions having a non-linear profile, such as a concave profile, that cannot be defined by a single straight line in a spanwise direction. Further description of an airfoil 54, 56 have such a non-linear sidewall regions will now be provided in connection with FIG. 4. Additional description of airfoils having non-linear sidewall regions can also be found in the following U.S. patent application, which is hereby incorporated by reference: U.S. patent application Ser. No. 16/201,699, entitled "HIGH PERFORMANCE WEDGE DIFFUSERS FOR COMPRESSION SYSTEMS," and filed with the United Stated Patent and Trademark Office on Nov. 27, 2018. A substantial portion of the following description is carried-over from this document.

Turning to FIG. 4, a single diffuser airfoil 54, 56 is shown in isolation. As described above, diffuser airfoil 54, 56 includes an inboard airfoil portion 54 and an outboard airfoil portion 56, which are separated by a gap as taken along the length of the airfoil. A sealing member or material 108 may be positioned in this gap to reduce leakage and boost performance; however, this is not necessary in all embodiments. In addition to airfoil portions 54, 56, diffuser airfoil 54, 56 further contains: an upstream or inboard end 110; an opposing, downstream or outboard end 112; and an intermediate section 114 extending between ends 110, 112. The radially-outward direction of airflow along diffuser airfoil 54, 56 is represented by arrow 116 in FIG. 4, while arrow 118 denotes the tangential component of the airflow. Diffuser airfoil 54, 56 further includes a pressure face, side, or sidewall 120 (principally impinged upon by the airflow due to tangential component 118); and a suction face, side, or sidewall 122 opposite pressure sidewall 120 taken through the airfoil thickness. Suction sidewall 122 is further divided (in a conceptual or design sense) into two sidewall regions 124, 126 distinguished by differing sidewall geometries in the spanwise direction, as discussed more fully below. As can be seen, sidewall region 124 is located closer to inboard end 110 of diffuser airfoil 54, 56 and is consequently referred to below as "upstream sidewall region 124." Conversely, sidewall region 126 is located closer to outboard end 112 and is consequently referred to below as "downstream sidewall region 126." Diffuser airfoil 54, 56 further includes a transition region or zone 128 located at the juncture between ends 110, 122. Transition regions 128 represent the sidewall location at which suction sidewall 122 transitions from a first sidewall geometry or profile (that of upstream sidewall region 124) to a second, different sidewall geometry or profile (that of downstream sidewall region 126) in the illustrated example.

In various embodiments, upstream sidewall region 124 of suction sidewall 122 is imparted with a linear (straight line element) sidewall geometry, as taken in a spanwise direction; while downstream sidewall region 126 of suction sidewall 122 is imparted with a non-linear sidewall geometry, such as a concave sidewall geometry, in the spanwise direction. In such embodiments, the concave geometry or profile of downstream sidewall region 126 may have a maximum concavity or depth $D_1$, as taken at or adjacent outboard end 112 of diffuser airfoil 54, 56 and measured at the midspan of airfoil 54, 56. In the illustrated example in which the interior faces of endwalls 58, 60 bounding diffuser flow passage section 46, 48 are parallel, the diffuser midspan may be defined by a plane, the location of which is generally identified in FIG. 4 by dashed line 130. In further implementations, however, the diffuser midspan may have a non-planar shape; e.g., as will the case when, for example, the interior faces of endwalls 58, 60 are conical or otherwise have a non-parallel relationship. In addition to $D_1$, the respective thicknesses of diffuser airfoil 54, 56 at junctures with forward endwall 58 and aft endwall 60 are also identified in FIG. 4 by double-headed arrows "$T_1$" and "$T_2$," respectively. Finally, double-headed arrow "S" denotes the span of airfoil 54, 56 in FIG. 4.

When the concave geometry of downstream sidewall region 126 is bilaterally symmetrical about diffuser midspan 130, the maximum concavity depth may be located at diffuser midspan 130. In other implementations, the maximum concavity depth may be located above or below diffuser midspan 130 depending upon, for example, the particular geometry of downstream sidewall region 126 of suction sidewall 122. In still other instances, and as noted above, high performance radial diffuser assembly 16 may have a leaned or conical shape, which may be the case when diffuser assembly 16 is utilized within a mixed-flow compression system. In such instances, diffuser endwalls 58, 60 may not have parallel disc-like shapes, but rather conical or other shapes, as previously-noted. Further, in such instances, the midspan of diffuser assembly 16 will not be defined as a plane, but rather as a more complex (e.g., conical) three dimensional shape. Regardless of the shape of endwalls 58, 60, the maximum concavity depth of the non-linear sidewall regions will typically occur in a predefined range along the span of the airfoils. For example, in embodiments, the maximum concavity depth of the non-linear sidewall regions may occur between about 30% and about 70% of the span of a given diffuser airfoil. In other instances, the maximum concavity depth may occur outside of the aforementioned spanwise range.

The depth of concavity at the midspan of suction sidewall 122 (again, identified as "$D_1$" in FIG. 4) gradually decreases when moving from outboard end 112 of diffuser airfoil 54, 56 in a radially inward direction toward inboard end 110. Depending upon the particular manner in which downstream sidewall region 126 is contoured or shaped, the suction side (SS) midspan concavity depth ($D_1$) may decrease in a linear or gradual fashion (shown) or, instead, decrease in a non-linear manner. The SS midspan concavity depth ($D_1$) decreases in this manner until reaching a zero value at transition zone 128 in the illustrated embodiment. A smooth, step-free or aerodynamically-streamlined sidewall topology is consequently provided when transitioning from the planar sidewall geometry of upstream sidewall region 124 to the concave sidewall geometry of downstream sidewall region 126. In a similar regard, the values of $T_1$ and $T_2$ may likewise decrease from maxima at outboard end 112 to minima at inboard end 110 to impart diffuser airfoil 54, 56 with its wedge-shaped geometry and, particularly, to impart inboard end 110 with a relatively narrow or reed-like shape well-suited for partitioning the incoming airflow in a low resistance manner.

With continued reference to FIG. 4, pressure sidewall 120 of diffuser airfoil 54, 56 may be imparted with a sidewall geometry or profile similar to, if not substantially identical to (mirrors) that of suction sidewall 122. In such embodiments, and as does suction sidewall 122, pressure sidewall 120 may include: (i) an upstream sidewall region imparted with a first (e.g., linear or straight line element) sidewall geometry and corresponding to upstream sidewall region 124 of suction sidewall 122, and (ii) a downstream sidewall region imparted with a second (e.g., non-linear or concave) sidewall geometry and corresponding to downstream sidewall region 126 of suction sidewall 122. Further, the sidewall geometry of pressure sidewall 120 from the first sidewall geometry to the second sidewall geometry in a transition region, the position of which may vary relative to region 128 shown in FIG. 4. As further labeled in FIG. 4, the maximum concavity of pressure sidewall 120 ($D_2$) may occur at outboard end 112 of diffuser airfoil 54, 56 taken at the diffuser midspan. In the illustrated example in which sidewalls 120, 122 have similar or substantially identical geometries, $D_1$ and $D_2$ may be substantially equivalent.

As noted above, sidewalls 120, 122 may be imparted with identical or substantially identical concave profiles in at least some embodiments; e.g., such that sidewalls 120, 122 are mirror opposites and symmetrical about a plane corresponding to double-headed arrow "S" in FIG. 5. Embodiments of diffuser assembly 16 are not so limited, however. For example, in further embodiments, $D_1$ and $D_2$ may vary with respect to each other or, perhaps, only one of pressure sidewall 120 and suction sidewall 122 may be imparted with a concave (or other non-linear) sidewall region. Still other variations in sidewall geometries are also possible without departing from the scope of the disclosure. For example, in alternative implementations, the upstream sidewall region of pressure sidewall 120 and/or suction sidewall 122 may be imparted with a slight concavity or another non-linear geometry, such as an undulating or chevron-shaped geometry. Further, in certain embodiments, pressure sidewall 120 and suction sidewall 122 may both have concave profiles at certain locations, but the concavity suction sidewall 122 may be shallower than that of pressure sidewall 120 (such that $D_1<D_2$) to, for example, reduce flow separation within the diffuser flow channels. In yet other embodiments, this relationship may be inverted such that $D_2<D_1$; $D_1$ and $D_2$ may be equivalent; or one of sidewalls 120, 122 may be imparted with strictly a linear (straight line element) sidewall geometry, while the other of sidewalls 120, 122 is imparted with a concave sidewall geometry. As a still further possibility, pressure sidewall 120 and suction sidewall 122 may each transition from a linear sidewall geometry to a non-linear (e.g., concave) sidewall geometry when moving along the length of the airfoil; however, the particular locations at which sidewalls 120, 122 transition from linear to non-linear (e.g., concave) sidewall geometries may differ, as discussed more fully below in conjunction with FIG. 5.

Advancing next to FIG. 5, two adjacent diffuser airfoils 54, 56, potentially contained in embodiments of diffuser assembly 16 are shown with endwalls 58, 60 hidden from view and viewed axially along an axis parallel to centerline 20. Diffuser airfoils 54, 56 laterally bound or border the illustrated diffuser flow passage section 46, 48, which extends between an inlet 132, and a corresponding outlet 134 of diffuser flow passage section 46, 48. Diffuser flow diffuser flow passage section 46, 48 has a throat, which is generally identified by double-headed arrow 136 in FIG. 5. The throat of diffuser flow passage section 46, 48 is measured along the arc distance tangent to facing airfoil surfaces defining a particular diffuser flow channel; e.g., facing surfaces 120, 122 defining diffuser flow passage section 46, 48 in the illustrated example. Dashed lines 138, 140 further denote the concavity of sidewalls 120, 122, respectively, as taken at the airfoil midspan of both diffuser airfoils 54, 56. Dashed lines 138, 140 represent the maximum concavity depth of sidewalls 120, 122 in the illustrated example; however, this need not be the case in other embodiments when, for example, the concave geometry (or other non-linear geometry) of the sidewall regions is asymmetrical at the midspan. The leading-edge passages of circumferentially-split diffuser assembly 16 may be shaped and dimensioned (e.g., imparted with a rectangular (2D-straight) or parallelogram (3D-lean) shape) to optimize spanwise incidence to incoming flow and thereby reduce any associated blockage and performance impact to diffuser assembly 16, as shown.

As shown in the lower left corner of FIG. 5, arrow "n" represents the direction of rotation of impeller 18 (FIG. 1) and, therefore, the direction of the tangential component or swirl imparted to the airflow entering circumferentially-split diffuser assembly 16. Several dimensional parameters are also called-out in FIG. 5 and defined as follows:

2θ—the divergence angle of diffuser flow diffuser flow passage section 46, 48 taken in a plane orthogonal to centerline 20 and at the junctures of diffuser airfoils 54, 56 with either or both of endwalls 58, 60 (FIG. 1);

2θ'—the divergence angle of diffuser flow diffuser flow passage section 46, 48 taken along the diffuser midspan (a portion of which is identified by dashed line 130 in FIG. 4);

L—the length of diffuser flow diffuser flow passage section 46, 48;

r2—the exit radius of impeller 18;

r4—the radius of the leading edge of diffuser assembly 16;

r6—the trailing edge radius of diffuser assembly 16;

h5—the width of diffuser flow channel throat 136; and h6—the exit width of diffuser flow diffuser flow passage section 46, 48.

The locations at which sidewalls 120, 122 of diffuser airfoil 54, 56 transition from linear (straight line element) sidewall geometries to non-linear (e.g., concave) sidewall geometries can be more clearly seen in FIG. 5. Note, specifically, intersection points 142 between dashed lines 138 (representing the maximum depth of concavity for the non-linear sidewall regions of pressure sidewalls 120) and the outline of pressure sidewalls 120. Note also intersection point 144 between dashed lines 140 (representing the maximum depth of concavity for the non-linear sidewall region of suction sidewall 122) and the outline of suction sidewalls 122. Intersection points 142, 144 thus demarcate to the transition regions between the upstream sections of airfoil sidewalls 120, 122 having linear sidewall geometries and the downstream sections of airfoil sidewalls 120, 122 imparted with concave sidewall geometries.

The locations at which airfoil sidewalls 120, 122 transition from linear sidewall geometries to non-linear geometries will vary among embodiments. In many instances, at least one airfoil sidewalls 120, 122 transitions from a linear sidewall geometry to a non-linear (e.g., concave) sidewall geometry at location adjacent flow channel throat 136; the term "adjacent," as appearing in this context, defined as located no further from throat 136 than 35% of the sidewall length in either the upstream or downstream direction. Accordingly, pressure sidewall 120 is considered to transition from a linear sidewall geometry to a concave sidewall geometry at a location adjacent throat 136 when intersection point 142 is located no further than 35% of the length of pressure sidewall 120. Similarly, suction sidewall 122 is considered to transition from a linear sidewall geometry to a concave sidewall geometry at a location adjacent throat 136 when intersection point 144 is located no further than 35% of the length of suction sidewall 122. More generally, at least one of airfoil sidewalls 120, 122 will transition from a linear sidewall geometry to a non-linear sidewall geometry in a transition region or juncture, which is located closer to flow channel throat 136 than to either the inboard or outboard airfoil end. Both inboard airfoil portions 54 and outboard airfoil portions 56 have such non-linear sidewall geometries; or, stated differently, the concave sidewalls of airfoils 54, 56 extend from inboard airfoil portions 54 to outboard airfoil portions 56 as shown in FIGS. 4 and 5.

As previously indicated, at least one airfoil sidewalls 120, 122 will typically transition from a linear sidewall geometry to a non-linear (e.g., concave) sidewall geometry in a region or location adjacent flow channel throat 136. The transition region can be located upstream of, located downstream of, or located substantially at low channel throat 136. For example, as indicated in FIG. 5 by intersection point 144, suction sidewalls 122 may transition from a linear sidewall geometry to a concave sidewall geometry at a location slightly downstream of flow channel throat 136. Similarly, and as indicated in FIG. 5 by intersection point 142, pressure sidewalls 120 may transition from a linear sidewall geometry to a concave sidewall geometry at a locations further downstream of flow channel throat 136, but still located closer to throat 136 than to outer airfoil ends 112. Such a design may help maximize available channel length for transitioning from the minimum concavity to a maximum concavity at outboard ends 112 of airfoils 54, 56, while further promoting airflow to enter diffuser flow passage inlets 132 in a relatively smooth, un-separated manner. These advantages notwithstanding, airfoil sidewalls 120, 122 can transition from linear to non-linear sidewall geometries at other locations along the length of the airfoils in alternative embodiments, or only one of pressure sidewalls 120 and suction sidewalls 122 may be imparted with a non-linear sidewall geometry.

The value of 2θ (the divergence angle of diffuser flow passage section 46, 48 at the junctures of airfoils 54, 56 with either of endwalls 58, 60) and the value of 2θ' (the divergence angle of diffuser flow diffuser flow passage section 46, 48 at the diffuser midspan) will vary among embodiments. As a point of emphasis, the respective values of 2θ and 2θ' may be tailored or adjusted by design to, for example, suit a particular application or usage. In embodiments, 2θ and 2θ' may be selected based upon the characteristics of impeller 18 or other components of the centrifugal compression system in which diffuser assembly 16 is utilized, such as compression system 12 shown in FIG. 1. This notwithstanding, certain fundamental relationships may pertain across embodiments of diffuser assembly 16. For example, it may generally be desirable to maximize the value of 2θ' to the extent practical, while preventing 2θ' from becoming overly large and promoting flow separation, turbulence, and other undesired effects within diffuser flow passage sections 46, 48, particularly under overspeed conditions. To balance these competing concerns, 2θ' may range from about 5 degrees (°) and about 14°; and, preferably, between about 7° and about 12° in embodiments. In other implementations, 2θ' may be greater than or less than the aforementioned ranges. Additionally or alternatively, 2θ' may be equal to or greater than 2θ plus about 4°, while 2θ' is equal to or less than 14° in at least some instances such that the following equation pertains: 2θ+4°≤2θ'≤14°. In still other implementations, and by way of non-limiting example, 2θ' may between 10% and 50% greater than 2θ and, more preferably, between 35% and 40% greater than 2θ. Finally, and briefly again to FIG. 4, the angular value of 2θ' may be selected based upon the depth of concavity at the outboard ends of airfoils 54, 56 such that, for example, $D_1$, $D_2$, or both range from about 5% to about 25% of $T_1$ or $T_2$ in embodiments. In still other embodiments, the values of $D_1$, $D_2$, 2θ, and 2θ' may be varied, as appropriate, to suit a particular application or usage of diffuser assembly 16.

As indicated above, the term "wedge diffuser assembly" is defined as a diffuser containing a plurality of airfoils having airfoil thicknesses at or adjacent the downstream (e.g., outboard) ends of the airfoils exceeding, and generally tapering downward to, the airfoil thicknesses at or adjacent the upstream (e.g., inboard) ends of the airfoils. The suction and pressure sides of a diffuser airfoils may have a linear profile, a curved profile, a line-arc-line profile, or other profile, as seen looking along the centerline of diffuser assembly 16 in a fore-aft or aft-fore direction. For example, and as shown in FIG. 5, pressure sidewalls 120 and/or suction sidewalls 122 of diffuser airfoils 54, 56 may follow a line-arc-line profile, with a first line (linear profile section) occurring between inboard airfoil ends 110 leading toward throat region 136; a slight arc (curved profile section) along suction sidewalls 122 in throat region 136; and a second linear (linear profile section) following throat region 136 extending to outboard airfoil ends 112. Again, in further embodiments, suction sidewalls 122 and/or pressure sidewalls 120 may have more complex or less complex profiles; e.g., sidewalls 120, 122 may each have a linear or gently curved profile extending from inboard airfoil ends 110 to outboard airfoils ends 112.

Imparting airfoils 54, 56 with a concave (or other non-linear) sidewall regions, as described above, can provide multiple benefits. Improved mixing and diffusion can be achieved in diffuser flow passage sections 46, 48 due, at least in part, to the variance in the 2θ and 2θ' parameters, as previously discussed. Concurrently, wake and flow blockage may be reduced downstream of diffuser flow passage sections 46, 48; e.g., as may help optimize performance of deswirl flow passage section 52 shown in FIGS. 1 and 2. For at least these reasons, embodiments of circumferentially-split diffuser assembly 16 are usefully with such concave airfoils 54, 56 when utilized within GTEs demanding higher pressure ratios (improved pressure recovery in the diffusion system), improved stage efficiency, and similar stability (surge margin) as compared to traditional diffusers. This notwithstanding, it is again noted that airfoils 54, 56 of circumferentially-split diffuser assembly 16 need not have concave (or other non-linear) sidewall regions in all embodiments; and may instead possess more conventional linear or straight-line element sidewalls in other implementations.

CONCLUSION

The foregoing has provided circumferentially-split diffuser assemblies suitable for usage within compression systems, including GTE compressor sections. Embodiments of the above-described diffuser assembly include separately-formed inner and outer annular diffuser structures, which define different portions or segments of the diffuser vanes or airfoils. By forming the outer annular diffuser structure portion (including outboard portions of the diffuser airfoils) separately from the inboard portion of the diffuser, several benefits may be realized. The inner and outer diffuser structures can be fabricated from disparate materials in embodiments to, for example, extend service life through material fatigue reduction, provide weight savings, increase Ti-fire resistance, enhance erosion resistance, and provide various other benefits. The circumferentially-split construction of the diffuser assembly can further provide structurally robust path for transmitting structural (e.g., bearing) loads axially across the body of the diffuser assembly, while bypassing the inner annular diffuser structure, in embodiments. This may further enable the inner annular diffuser structure, including inboard airfoil portions, to be imparted with relatively thin-walled geometries. The circumferentially-split design further provides other secondary benefits, such as easing assembly and allowing optimized fastener count (via the elimination of the through bolt architecture). Further performance benefits may be realized, at least in some embodiments, by imparting the split airfoils with sidewalls having non-linear (e.g., concave) sidewall geometries, as previously described.

While multiple exemplary embodiments have been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as setforth in the appended Claims.

What is claimed is:

1. A circumferentially-split diffuser assembly, comprising:
   flow passages extending through the circumferentially-split diffuser assembly and including diffuser flow passage sections;
   diffuser airfoils interspersed with the diffuser flow passage sections in an annular array as taken about a centerline of the circumferentially-split diffuser assembly, the diffuser airfoils comprising:
   inboard airfoil segments distributed around the centerline; and
   outboard airfoil segments further distributed around the centerline at locations adjacent the inboard airfoil segments;
   an inner annular diffuser structure defining the inboard airfoil segments;
   an outer annular diffuser structure defining the outboard airfoil segments, the outer annular diffuser structure attached to and extending around the inner annular diffuser structure;
   a forward attachment interface;
   an aft attachment interface located aft of the forward attachment interface, as taken along the centerline; and
   a primary load path extending from the forward attachment interface, across the outboard airfoil segments, and to the aft attachment interface, wherein:
: the outer annular diffuser structure comprises an inner annular flange positioned adjacent a backside of the inner annular diffuser structure, as taken along the centerline,
: the forward attachment interface comprises a first plurality of fasteners engaging the outer annular diffuser structure and the inner annular diffuser structure, and
: the aft attachment interface comprises a second plurality of fasteners engaging the outer annular diffuser structure and the inner annular flange, while maintaining an axial separation from the backside of the inner annular diffuser structure.

2. The circumferentially-split diffuser assembly of claim 1 further comprising an annular gap located at an interface between the inner annular diffuser structure and the outer annular diffuser structure.

3. The circumferentially-split diffuser assembly of claim 1 wherein the inboard airfoil segments and at least a portion of inner annular diffuser structure are composed of a first material;
: wherein the outboard airfoil segments and at least a portion of outboard annular diffuser structure are composed of a second material different than the first material.

4. The circumferentially-split diffuser assembly of claim 3 wherein the first material has an increased erosion resistance as compared to the second material.

5. The circumferentially-split diffuser assembly of claim 3 wherein the first material has a lower titanium content than does the first second material.

6. The circumferentially-split diffuser assembly of claim 3 wherein the first material has a higher density than does the second material.

7. The circumferentially-split diffuser assembly of claim 3 wherein the outer annular diffuser structure is fabricated as a single piece composed essentially of the second material.

8. The circumferentially-split diffuser assembly of claim 1 wherein the outer annular diffuser structure has an average wall thickness greater than that of the inner annular diffuser structure.

9. The circumferentially-split diffuser assembly of claim 1 wherein the primary load path extends through the outer annular diffuser structure, while bypassing the inner annular diffuser structure.

10. The circumferentially-split diffuser assembly of claim 1 wherein the circumferentially-split diffuser assembly is utilized within a Gas Turbine Engine (GTE) including a compressor frame and a bearing support structure; and wherein, when installed within the GTE, the circumferentially-split diffuser assembly is attached to the compressor frame through the forward attachment interface and to the bearing support structure through the aft attachment interface.

11. The circumferentially-split diffuser assembly of claim 1 further comprising:
: a forward endwall bounding a portion of the diffuser flow passage sections, the first plurality of fasteners extending toward, but terminating prior to breaching the forward endwall; and
: an aft endwall bounding a portion of the diffuser flow passage sections and spaced from the forward endwall along the centerline, the second plurality of fasteners extending toward, but terminating prior to breaching the aft endwall.

12. The circumferentially-split diffuser assembly of claim 1 wherein the inboard diffuser structure comprises:
: a forward endwall partially bounding the diffuser flow passage sections;
: an outer annular flange abutting the outer annular diffuser structure; and
: a conical arm connecting the forward endwall to the outer annular flange.

13. The circumferentially-split diffuser assembly of claim 1 wherein the inboard and outboard airfoil segments each comprise a non-linear sidewall region.

\* \* \* \* \*